April 7, 1959  F. STEINWACHS  2,880,511
APPARATUS FOR DETERMINING ADAPTABILITY OF WRITING
IMPLEMENTS TO PERSONS USING THE SAME
Filed July 7, 1955  5 Sheets-Sheet 1
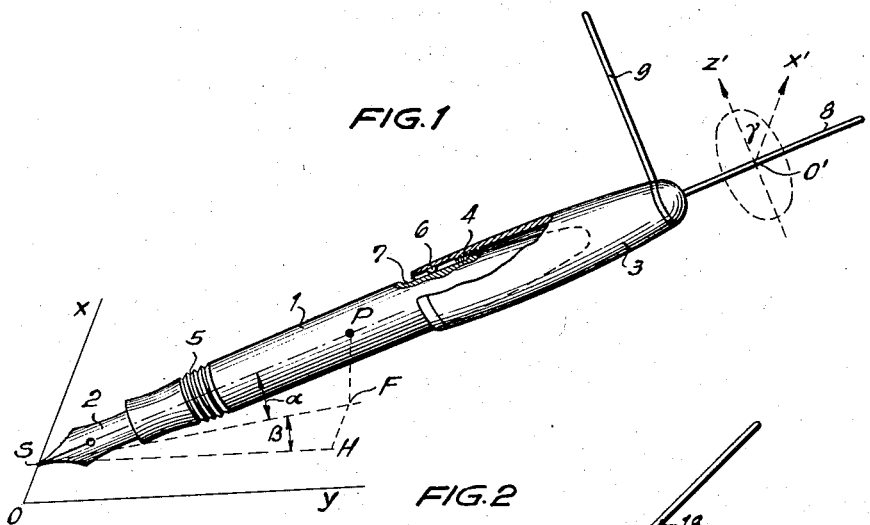
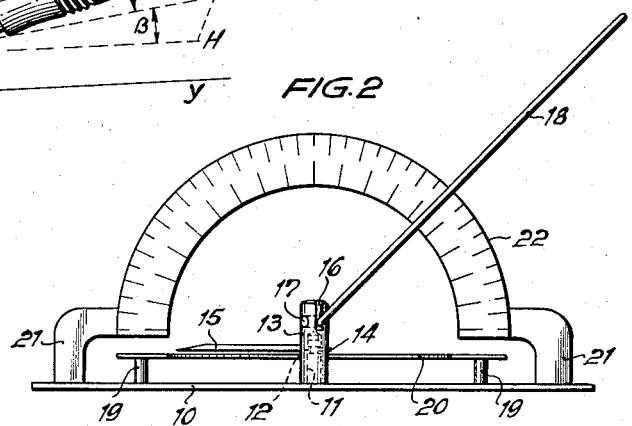
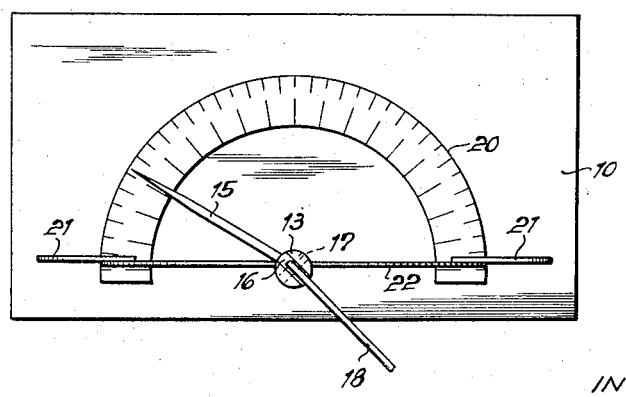
INVENTOR
FRIEDRICH STEINWACHS April 7, 1959 F. STEINWACHS 2,880,511
APPARATUS FOR DETERMINING ADAPTABILITY OF WRITING
IMPLEMENTS TO PERSONS USING THE SAME
Filed July 7, 1955 5 Sheets-Sheet 2
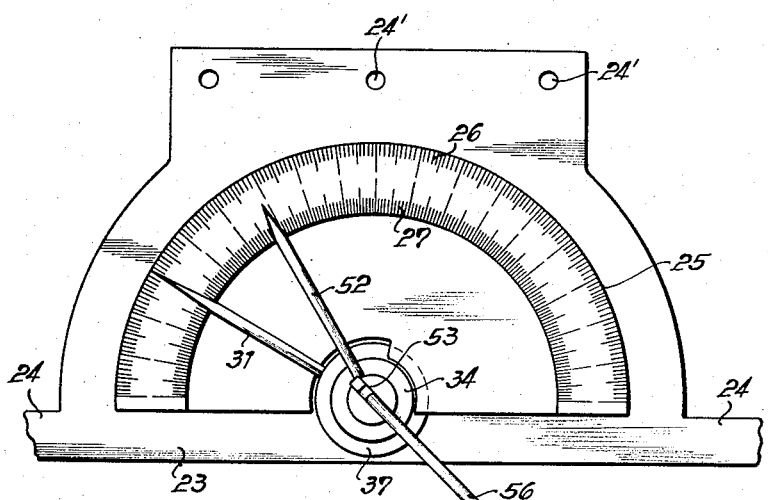
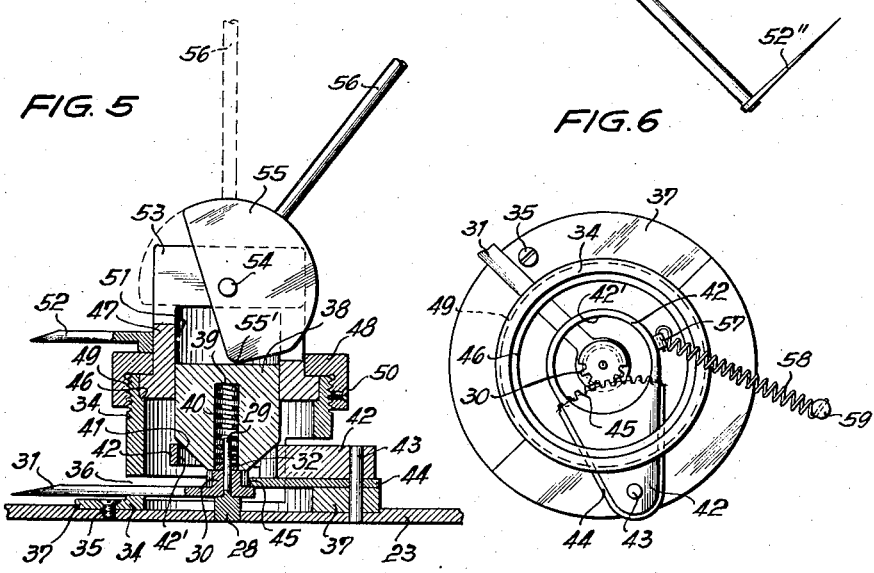
INVENTOR
FRIEDRICH STEINWACHS April 7, 1959 F. STEINWACHS 2,880,511
APPARATUS FOR DETERMINING ADAPTABILITY OF WRITING
IMPLEMENTS TO PERSONS USING THE SAME
Filed July 7, 1955 5 Sheets-Sheet 3

INVENTOR
FRIEDRICH STEINWACHS
BY *Leon M. Strauss*
AGT.

April 7, 1959 F. STEINWACHS 2,880,511
APPARATUS FOR DETERMINING ADAPTABILITY OF WRITING
IMPLEMENTS TO PERSONS USING THE SAME
Filed July 7, 1955 5 Sheets-Sheet 5

INVENTOR
FRIEDRICH STEINWACHS

United States Patent Office 2,880,511
Patented Apr. 7, 1959

2,880,511

APPARATUS FOR DETERMINING ADAPTABILITY OF WRITING IMPLEMENTS TO PERSONS USING THE SAME

Friedrich Steinwachs, Tubingen-Lustnau, Germany

Application July 7, 1955, Serial No. 520,569

Claims priority, application Germany January 12, 1955

10 Claims. (Cl. 33—1)

This invention relates to an apparatus for determining the usual writing position in which a writing tool or implement is held in a person's hand during use.

It is an object of the present invention to provide means facilitating determination of the normal position assumed by a writing tool or implement when held in the hand of a person using said implement with the ultimate aim of providing such person with a writing implement, such as a fountain pen, which performs to the best possible advantage when held in said position.

It is another object of the present invention to provide means enabling the writing characteristics of a writing implement to be accurately determined so as to ensure use of such writing implement by a person whose hand assumes a normal writing position best suited to the aforesaid writing characteristics of said implement.

It is still another object of the present invention to provide means affording novel and greatly simplified measuring instruments adapted to be used either in analyzing the normal writing actions of a human being or in instructing the latter as to the best possible manner of holding a writing tool.

It is also an object of the present invention to provide means conducive to measurement of the angles between the axis of a writing tool, as the latter is held by a user against a writing surface, and at least two reference planes, one of which coincides with or lies parallel to the plane of the writing surface and the other of which is perpendicular to said plane of said writing surface.

Another object of the present invention is to provide means leading to measurement of the aforesaid angles in conjunction with the measurement of an additional angle in a plane perpendicular to the axis of said writing tool and included between a line coinciding with or parallel to the direction of a line of writing on said writing surface and a line coinciding with or parallel to an indicating element extending substantially at right angles to said axis of said tool, whereby the spatial location of said tool relative to said writing surface and during use may be precisely determined.

A further object of the present invention is the provision of means ensuring determination of the aforesaid angles independently of one another and on scales which may be arranged either in one and the same plane or in different planes.

It is still a further object of the present invention to provide means presenting compact and uncomplicated apparatus permitting a series of independent linear movements to be performed by elements of said apparatus in accordance with the angular disposition during writing operations of a writing tool being investigated in such a manner that said linear movements may be transformed into independent angular movements of suitable indicating means to give a direct indication of the writing characteristics of said tool.

More particularly, according to the present invention, the angular position in which the writing implement is held by a prospective user is determined, for example, by aligning or parallelizing a universally movable rod with the axis of the writing implement and by measuring the angles formed between said rod and at least two reference planes. Such aligning may be accomplished by sighting along said rod in the direction of said implement.

The angles so formed between said rod and said planes may be measured by mechanical means such as protractors or similar scales, or by means of optical, electrical, or combined electro-optical means. The relationships between such angles and other empirically calculated or measured values apposite to the choice of a writing implement, for example, direction and magnitude of writing pressure, to determine whether or not said implement is suited to the writing style and habits of the prospective user.

In accordance with a refinement of the present invention there is measured, besides a first or side angle in a horizontal plane and a second or height angle in a vertical plane, a third or rotation angle about the axis of said implement in a plane substantially perpendicular to the axis of said rod and, of course, to the axis of said implement.

Such rotation angle is determined by means of extension elements disposed, respectively, perpendicularly to the axes of said implement and said rod, the extension element on said implement assuming a position corresponding to the rotation of said implement about its own axis after which the extension element on said rod is rotated to bring it into alignment with said first-mentioned extension element. The angle through which the second extension element has been rotated is the desired rotation angle.

By means of the present invention it becomes possible for the first time, through an objective measuring process, to determine the manner in which a person normally holds a writing implement or tool, so that he might later choose such an implement, for example, a fountain pen, which most closely corresponds in its writing characteristics to the measurements determined for said person. Thus it is now possible, as it were, to purchase writing implements by prescription.

Once the pertinent angles have been measured, the correct fountain pen, and especially the pen-point element characterized in terms of its structure, i.e., shape, breadth, length, elasticity, and inclination during writing, for example, corresponding to said angles may be determined. The new apparatus according to the invention may also be applied to clinical and pedagogical purposes, such as correction of abnormal pen-holding positions, as well as to general writing instruction.

The instruments for putting the process of the invention into practice may be so constructed that the final reading, instead of being expressed numerically in terms of angles, may be expressed in terms of index cyphers, letters or other symbols, such as colored markings, which symbols correspond individually and respectively to predetermined writing characteristics of the pen, or different combinations of which symbols correspond to predetermined pen characteristics. The arrangement may be such that in one reading window or opening for a scale the numerical angle values may be read off while in another reading window the corresponding index symbols may be viewed.

In this manner it may be provided that one and the same index value should correspond not only to a predetermined angle measurement but rather to an angular range. The correlation of selected writing implements or pen types to the measured values may be carried out with regard to other pertinent values of writing procedures, viz, direction and magnitude of writing pressure, by means of tables, graphs or slide rule-like calculating instruments.

For purposes of the present invention it is sufficient to consider only three values of writing pressure directions and three values of writing pressure magnitudes. As to the former, these may be: (1) writing with accentuated up and down or vertical strokes, (2) writing with accentuated cross or horizontal strokes, and (3) writing with equally accentuated strokes in all directions. The pertinent pressure grades may be labeled as "weak," "medium," and "strong." In lieu of the above-mentioned calculating instruments it is also possible to employ a device for registering or recording at least the writing pressures.

The comparison of the angular location of the fountain pen with the angular location of the sighting rod of the angle-measuring device is simplified in accordance with a further refinement of the invention by attaching a special sighting cap onto the fountain pen. This cap is provided with a sighting indicator extending axially of the cap and with another indicator extending at right angles to the axis of the cap. The function of the latter is to determine the angular rotation of the pen about its longitudinal axis, in other words, the rotation angle.

To this end, the sighting cap is provided with suitable guide means to fix its angular relation with respect to the body of the pen. The sighting cap may either be supported directly on the body of the pen or on the closure cap thereof which, during the use of the fountain pen, is normally placed onto the closed rear end of the body of said pen.

These and other objects of the invention will become further apparent from the following detailed description, reference being made to the accompanying drawings showing preferred embodiments of the invention.

In the drawings:

Fig. 1 is a graphic illustration of the principle of the present invention as applied to a fountain pen;

Fig. 2 is a front elevational view of one form of angle measuring instrument embodying the present invention;

Fig. 3 is a top plan view of the instrument of Fig. 2;

Fig. 4 is a top plan view of a modified form of angle measuring instrument embodying the invention;

Fig. 4a shows an attachment for use with either of the angle measuring instruments of Figs. 2 and 4;

Fig. 5 is a vertical sectional view through the center of the instrument of Fig. 4 and illustrates the indicator actuating mechanism on a larger scale;

Fig. 6 is a plan view of the mechanism of Fig. 5, certain of the upper parts being omitted;

Figure 7:
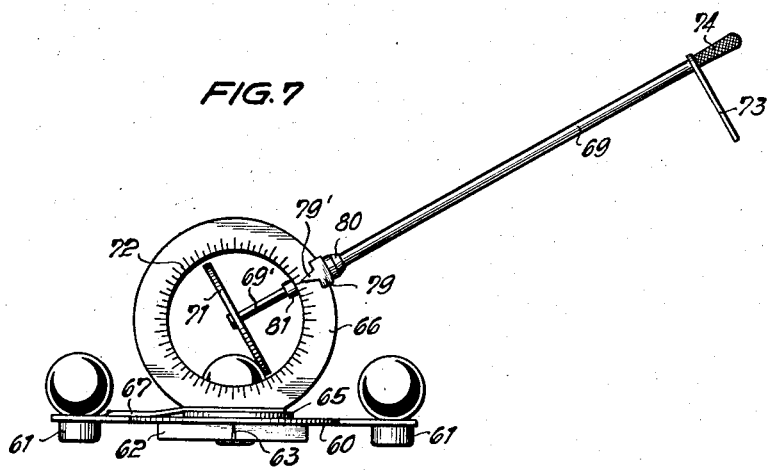
Fig. 7 is a front elevational view of still another modified form of angle measuring instrument according to the present invention.
Figure 8:
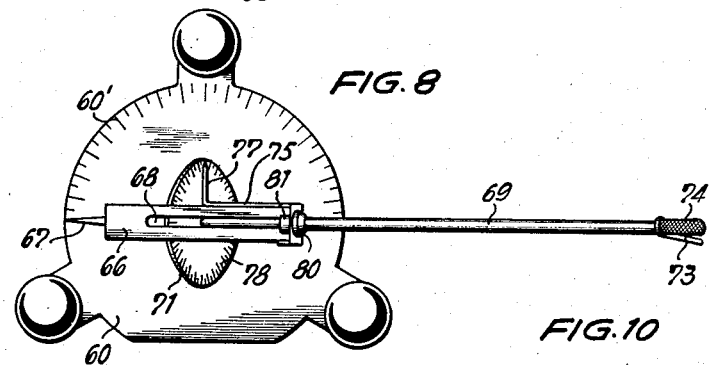
Fig. 8 is a top plan view of the instrument of Fig. 7.
Figure 9:
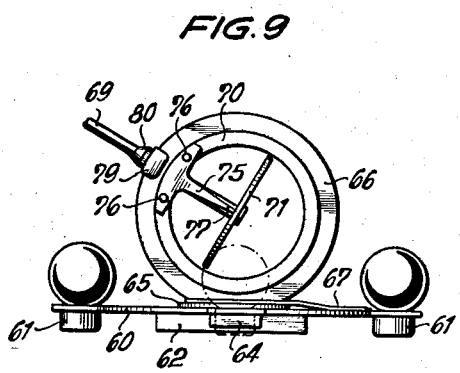
Fig. 9 is a rear elevational view of the instrument of Fig. 7.
Figure 10:
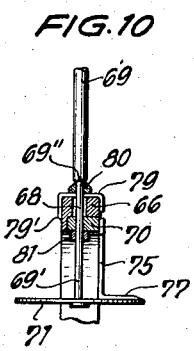
Fig. 10 shows, partly in section, certain details of the instrument of Figs. 7 and 9.

Referring now more particularly to Fig. 1, the principle of the invention is illustrated as applied to a fountain pen having a body or pen holder 1 supporting a pen or writing element 2 at one end and a cap 3 resembling a conventional closure cap at its opposite end, as is usual when the fountain pen is in use. Cap 3 has internal threads 4 for cooperation with external threads 5 disposed adjacent the front or writing end of the pen holder 1. In order to fix the angular relation of cap 3 relative to holder 1 there are provided a small tongue or projection 6 on the interior surface of cap 3 and a longitudinally extending groove 7 on the exterior surface of holder 1 adjacent the rear or closed end thereof, projection 6 fitting into groove 7.

In Fig. 1 the fountain pen is shown in a position analogous to the position it would assume when being used, although it should be noted that in actual use the pen would never be at such an acute angle to the plane of the writing paper. The writing surface or paper is conveniently represented as a plane defined by a pair of perpendicular axes $x$ and $y$ having an origin O, the writing lines extending parallel to the $x$-axis. The tip of the pen 2 and thus the axis of the pen holder 1 intersect the $x$—$y$ plane and the $x$-axis at point S, and said axis of the pen holder extends angularly and upwardly away from the $x$—$y$ plane.

If a perpendicular is dropped from a point P on the longitudinal axis of the pen to the $x$—$y$ plane so as to intersect the latter at point F, then the vertical angle $\alpha$ included between lines P—S and F—S represents the angular height or elevation of the axis of pen holder 1 above and relative to the normally horizontal plane of the writing surface. If a line S—H is now drawn through point S and parallel to the $y$-axis, then the horizontal angle $\beta$ between this line and line S—F represents the lateral angular displacement of the axis of the pen from the $y$-axis and relative to the vertical plane intersecting the plane of the writing surface along line S—H.

Attached to cap 3 adjacent the closed end thereof is a sighting indicator rod 9 which extends from cap 3 at right angles to the axis of the cap and of the pen holder 1. Although rod 9 may be adjustably mounted on cap 3, means (not shown) should be provided to clamp and immobilize the rod on the cap during any particular series of measurements.

Extending axially of and away from the closed end of cap 3 is a second sighting rod 8. A plane, oriented at right angles to said axis of the pen holder and represented diagrammatically by the ellipse shown in broken lines in Fig. 1, intersects rod 8 at point O' from which point a pair of axes $x'$ and $z'$ extend. The $x'$-axis extends parallel to the $x$-axis while the $z'$-axis extends parallel to rod 9.

It will be readily understood that when the pen is held in such a position that the concave or bottom portion of pen element 2 faces downwardly, i.e., directly toward the $x$—$y$ plane, then rod 9 (or the $z'$-axis) extends parallel to the $x'$-axis (or the $x$-axis). In Fig. 1, however, the pen is shown as having been rotated through an angle of 90° from the previously mentioned position, so that rod 9 (or the $z'$-axis) now extends substantially perpendicular to the $x'$-axis (or the $x$-axis). The rotation angle $\gamma$ between the $x'$ and $z'$ axes is thus 90° in Fig. 1. In general, however, the actual rotation angle during use of the pen usually lies somewhere between ±30° relative to the above-mentioned position in which $z'$ and $x'$ axes are parallel.

In accordance with the invention, therefore, at least the height or elevation angle $\alpha$ and the side angle $\beta$ are measured, and, wherever desired or necessary, also the rotation angle $\gamma$.

The measuring instrument of Figs. 2 and 3, which is designed to indicate only the elevation and side angles, comprises a base plate 10 to which a pivot pin 11 is attached, as by being riveted or threaded to said base plate. Pin 11 is provided with an annular peripheral groove 12 adjacent its upper end. A bearing sleeve 13 rotatably surrounds pivot pin 11 and is provided with an inwardly projecting pin or lug 14 which extends into groove 12 to prevent relative axial displacement between sleeve 13 and pivot pin 11.

Attached to the bearing sleeve 13 is an indicator or pointer 15. The upper end of sleeve 13 is split to provide a slot 16 which is traversed by a bearing pin 17 on which a sighting or indicator rod 18 is supported. Rod 18 may rotate or pivot about bearing pin 17 but is frictionally mounted on the latter so as to remain stationary in any position to which it is moved. Thus, sighting rod 18 may be rotated about pivot 11 as well as about pivot 17, whereby the rod may assume any desired spatial position.

Mounted on base plate 10 by means of spacer bolts 19 is a semi-circular scale 20 which cooperates with indicator or pointer 15. Scale 20 indicates the side angle β corresponding to that position of sighting rod 18 which the latter attains due to the rotation of sleeve 13. Also mounted on base plate 10 by means of angle brackets 21 is a semi-circular scale 22 lying in a plane perpendicular to the plane of scale 20. The centers of both scales preferably lie on the axis of pivot pin 11.

For measuring purposes the instrument of Figs. 2 and 3 is placed on the writing surface plane, i.e., the $x$—$y$ plane, or maintained in a plane parallel to said writing surface plane so that the null or zero lines of the scales 20 and 22 extend along the $x$-axis and parallel to the front edge of base plate 10.

Thereafter, the sighting rod 18 is so adjusted that it extends parallel to the axis of a pen holder 1 which is being held by the person doing the writing. The parallelism of rod 18 and pen holder 1 is visually determined.

The respective angles may now be determined from scales 20 and 22. The side angle β may be read off directly from scale 20 by means of pointer 15. The height angle α can be read off from scale 22 upon swinging rod 18 toward the scale 22 about the axis of pivot pin 11. Concurrently, it is possible, by placing the indicator 15 and the sighting rod 18 at the 90° marks of their respective scales 20 and 22, to determine the rotation angle γ of the pen from the scale 20 by means of a simple attachment added to the structure illustrated in Figs. 2 and 3.

Such an attachment, which may be employed either with the instrument according to Figs. 2 and 3 or with the instrument according to Figs. 4 to 6 to be described more fully hereinafter, is illustrated in Fig. 4a. The attachment consists of a small tube 56′ which may be frictionally and rotatably fitted onto rod 18 (56 in Figs. 4 to 6). Tube 56′ is provided with a lower indicator 52′ extending perpendicularly to the axis of the tube and with an upper indicator 52″ also extending perpendicularly to the axis of the tube. Indicator 52′ is employed to read the scale while indicator 52″ is a sighting member.

Depending on the type of instrument with which this attachment is to be employed, the indicators 52′ and 52″ include an angle of such magnitude that, when the elements for indicating the angles α and β are located at their 90° positions, the indicator 52′ is in its zero or other reference position when the indicator 52″ corresponds to an unrotated position of the pen, i.e., where the lower or concave surface of the pen element 2 faces directly down. The indicator 52″ in this position is, of course, parallel to a similar sighting member attached to the pen. If the indicator 52″ is now rotated through such an angle as to bring it to a position corresponding to the actual rotated position of the pen element, then the rotation angle may be directly read off from the scale 20, because the indicator 52′ will have been turned through the same angle as the indicator 52″.

Referring now to Figs. 4 to 6, the form of the invention there illustrated is also designed to indicate directly the height and side angles but not the rotation angle. In contradistinction to the embodiment of Figs. 2 and 3, however, the two scales are here positioned in the same plane so that they may be read off concurrently.

Specifically, a base plate 23, which is provided with arms 24 and with openings 24′ to facilitate attachment of said plate to any suitable support (not shown), has the scale plate 25 mounted thereon by means of spacer bolts or similar fasteners (not shown). On the scale plate 25 are provided a semi-circular scale 26 for the height angle α and a concentrically arranged semi-circular scale 27 for the side angle β.

Fixedly disposed in base plate 23 is a pivot pin 28, the upper part of which is reduced in cross-section to form a guide rod 29. A pinion 30 is rotatably mounted on guide rod 29 and has fixedly connected to it the height angle indicator 31. If desired, indicator 31 and pinion 30 may be integral with each other. The pinion 30 and indicator 31 are secured against axial displacement along rod 29 by means of a collar or collet 32.

The bearing point of the indicator 31 is located in the center of a substantially sleeve-like housing 34 which is attached to base plate 23 by means or screws or like fasteners 35 extending through a flange 37 attached to the housing. The indicator 31 extends out of the housing 34 through a slit 36.

The rod 29 extends into the bore 39 of a substantially cylindrical element 38 movable in the direction of its longitudinal axis. Disposed in the bore 39 is a helical or spiral compression spring 40. The lower end of the cylindrical element 38 is shaped to the form of a frustum of a cone 41.

Conical end 41 extends into a circular opening or cutout 42′ of a lever-like member 42 which is oscillatably supported on base plate 23 by means of a pivot pin 43 fixed to the base plate. Connected to member 42 is an element 44 provided with a segmental rack or gear 45, said gear segment 45 meshing with the pinion 30.

In the housing 34 there is formed a shoulder 46 which serves as a bearing surface for a sleeve 47 provided with a central bore 51 in which the element 38 is guided for reciprocal movement. In Fig. 5 the element is shown in its lowest position. The guide sleeve 47 is rotatably retained in the housing 34 by means of a cap nut 48 which is threaded onto the outer surface of housing 34 at 49 and fixed to said housing by means of a set screw 50.

Fixedly connected to sleeve 47 is an indicator 52, the latter thus being able to rotate with sleeve 47. In its upper portion, sleeve 47 is provided with a slit 53 which is traversed by a bearing pin 54. On bearing pin 54 an eccentric or cam 55, which carries the sighting rod 56, is swingably supported.

To the lever-like member 42 there is attached a projection or lug 57 in which one end of a tension spring 58 is anchored, the other end of the spring 58 being anchored to a pin 59 rigidly supported by the base plate 23. Spring 58 biases the member 42 to rotate about the pivot pin 43 in a clockwise direction as seen in Fig. 6.

When the sighting rod 56 is rotated about an axis which is perpendicular to base plate 23, then sleeve 47, the axis of which coincides with this axis, will be rotated correspondingly, whereby the indicator 52 will be rotated to indicate the side angle β on scale 27. If the sighting rod 56 is swung about the bearing pin or bolt 54 (from the broken line position to the solid line position in Fig. 5) together with cam 55, then the nose 55′ of the cam presses element 38 downwardly to at most the position shown in Fig. 5.

The inner periphery of the opening 42′ of the lever-like member 42 is maintained in contact with the conical end 41 of the cylindrical element 38 due to the tension of spring 58 even in the uppermost position of element 38. Thus, said upper position corresponds to a predetermined position of the gear segment 44, 45 which determines the null or zero position of the indicator 31 for the height angle.

Upon downward movement of the element 38 by means of cam nose 55', the cone 41 displaces the lever member 42 laterally so that the gear segment 45 is swung with the latter to drive the pinion 30 and therethrough the indicator 31. When the sighting rod 56 is moved to its highest position (as shown in broken lines in Fig. 5) then spring 58 acts to return the member 42 to its original position. This causes the opening 42' of the lever member 42 to urge the element 38 upwardly. The upper edge of opening 42' which cooperates with the cone 41 may, if desired, be beveled (not shown in Fig. 5).

The rotation angle $\gamma$ may be determined with the instrument of Figs. 4 to 6 by means of the attachment illustrated in Fig. 4a, the attachment being used in the same manner as described above with reference to the instrument of Figs. 2 and 3.

Referring now to Figs. 7 to 10, the instrument there shown is provided with a side angle scale and a height angle scale arranged in different planes and also with a rotation angle scale. This instrument comprises a base plate 60 having three feet 61 above which are located three spherical balls filled with lead or mercury so as to weigh down the instrument and secure it against inadvertent or accidental displacement. At one side of base plate 60 a transverse web piece 62 is formed and provided with an index mark 63 to aid in correctly orienting the instrument in the direction of the writing lines.

Rotatably mounted on base plate 60 is a plate 65, the bearing point of which is disposed in a housing 64 attached to the lower surface of base plate 60. Fixed to plate 65 is a scale ring 66 lying in a plane perpendicular to the plane of base plate 60, said ring serving for the measurement of the height angle $\alpha$. On base plate 60 there is provided a scale 60' for indicating the side angle $\beta$, scale 60' cooperating with an indicator 67 fixed to plate 65. Scale ring 66 is provided along a portion of its periphery with an elongated slit 68 through which a sighting rod 69 extends, said rod being swingably guided by ring 66.

To so guide and retain the rod 69, there is provided a second ring 70 which is rotatably supported within ring 66 and through which the rod 69 likewise extends. The upper, outer portion of the sighting rod 69 is thicker than the inner portion 69' which extends through ring 66 so that a shoulder 69" (see Fig. 10) is formed at the junction of said rod portions.

Interposed between shoulder 69" and ring 66 and surrounding the thinner part 69' of the sighting rod is a ring or annular member 80, and between the latter and ring 66 there is further provided an angular element 79 provided with an indicator 79' which cooperates with a scale 72 positioned on the front face of ring 66. The sighting rod 69 is secured against withdrawal from rings 66 and 70 by means of a collar 81 which is located on the thinner rod portion 69' inwardly of ring 70.

The thinner portion 69' of the sighting rod extends to the center of rings 66 and 70 at which point it carries a scale plate 71, the latter being fixedly attached to said rod by rivets or like fasteners. Mounted on ring 70, as by rivets 76, is an indicator 75, the pointer end 77 of which is bent at an angle thereto so as to travel over scale plate 71 on which a scale 78 is provided.

As described above, the sighting rod 69, which extends through rings 66 and 70, is retained against longitudinal or axial movement relative thereto but may rotate relative to said rings. Upon rotation of said rod the scale plate 71 also is rotated, whereby the pointer end 77 indicates the rotation angle $\gamma$ on scale 78.

At its outer end sighting rod 69 is provided with a sighting indicator 73 extending at right angles to the axis of rod 69, indicator 73 being adapted to be parallelized to a sighting rod attached to a writing implement, e.g. the element 9 in Fig. 1. The indicator 73 is preferably adjustably clamped to the rod 69. A threaded nut 74, which may have a knurled outer surface, is mounted on the outermost end of rod 69 and may serve simultaneously as a grip or handle for the rod and as means for fixing the location of the indicator 73 on the rod.

The instrument illustrated in Figs. 7 to 10, because of its compact arrangement, lends itself to easy inspection and thus is especially suitable for school instruction, the independent indication of the three angles to be measured being made feasible in the most simple manner possible. However, inasmuch as the three scales 60', 72 and 78 do not lie in the same plane, they cannot be read simultaneously. This disadvantage is overcome by the construction of Figs. 11 to 15, which will now be described.

Figure 11:
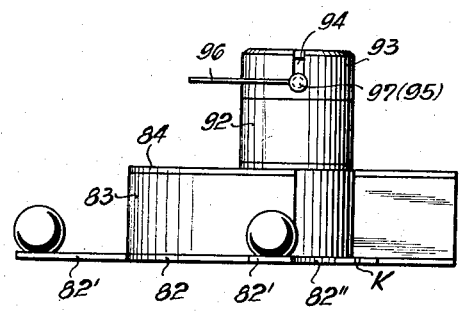
Fig. 11 is an elevational view of yet another modified form of angle measuring instrument according to the present invention.
Figure 12:
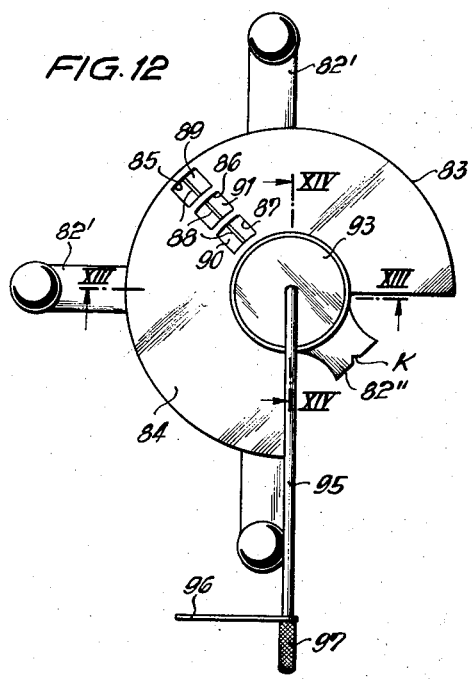
Fig. 12 is a top plan view of the instrument of Fig. 11.

As may be seen from Fig. 11, the base plate 82 is provided with weighted arms 82' to afford a secure foundation for the instrument. Mounted on the base plate is a housing 83 which is substantially cylindrical in shape except for a sector of 90° (see Fig. 12) which is removed therefrom. One arm 82" of base plate 82 extends into the right angle space so formed and is provided with an index mark or notch K. The upper end of housing 83 is closed by a lid or cover plate 84.

In lid 84 are provided three windows 85, 86 and 87 which lie along the same radius and in each of which an indicator or index bar 88 is arranged. Said bars also lie on the same radius. Rotatably mounted beneath lid 84 and visible through the windows 85, 87 and 86 are three circular scales 89, 90 and 91 for the height, side and rotation angles, respectively, or for values proportional to such angles.

Protruding upwardly and rotatably from lid 84 is a turret-like cylindrical housing 92, the upper lid or cover portion 93 of which is provided with a slit 94. Through the slit extends an oscillatable or swingable sighting rod 95 which may be clampingly or frictionally retained in any predetermined position. Extending at right angles to rod 95 and adjacent the outer end of the latter is a sighting indicator 96 and a nut 97 which serves as a grip or handle for the sighting rod 95 and as adjustable fastening means for the sighting indicator 96.

Internally of housing 83 a support or standard 98 is fixed, as by means of screws, to the base plate 82, from which standard a pair of vertically spaced support and guide plates 99 and 100 extend. A ball bearing 102 is mounted on a shoulder 101 of the support plate 100 and in turn supports a rotatable plate 103 to which the cylinder 92 carrying the lid 93 is threadedly connected.

Disposed in the upper portion of the cylindrical housing 92 is an axle 108 extending parallel to the base plate 82. A cam element 109 is affixed to the center of the axle 108. An extension 104 of the sighting rod 95, having a smaller diameter than the outer portion of said rod, intersects the axle 108 at right angles thereto and is supported by said axle or a suitable bearing element (not shown) connected therewith for rotation about its own axis but against longitudinal or axial displacement relative thereto. Fixedly connected to the sighting rod 95, moreover, is a gear wheel 110.

Upon swinging movement of the sighting rod 95 about the axle 108, the cam element 109 is also swung about said axle. The cam element 109 acts on a rod member 111 which is guided in a plate 105 threaded into the housing 92. At its lower end the rod member 111 supports a cone element 112, against the outer conical surface of which abuts a beveled, arcuate cutout or recess 113 of a lever 114 under the force of a suitable biasing spring (not shown).

It will, therefore, be readily understood that when the cam element 109 is swung to its uppermost position (see Fig. 14) the aforesaid biasing spring causes the rod 111 to be biased to and supported in its uppermost position due to the upward camming action of the cut-out portion 113 of the lever 114 on the cone element 112.

The lever 114 is connected to a gear segment 117 by means of a spacer sleeve 115 rotatably supported on a pin 116, said gear segment meshing with a pinion 118 rotatably supported on a pin 119 fixedly disposed in base plate 82. Connected to the pinion 118 is a carrier 120 on which the height angle scale 89 is supported.

Figure 13:
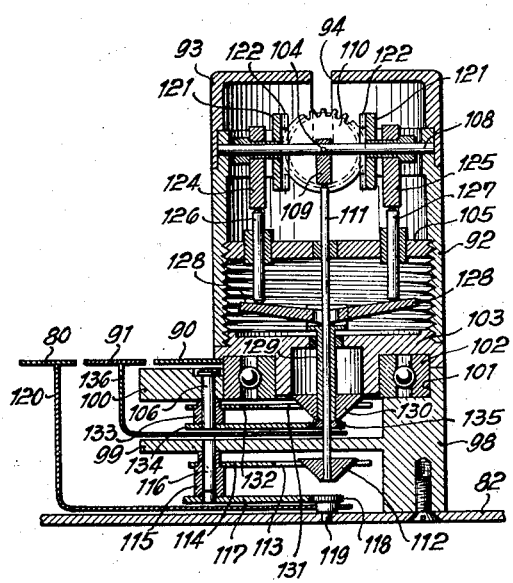
Fig. 13 is a sectional view taken along line XIII—XIII in Fig. 12.
Figure 14:
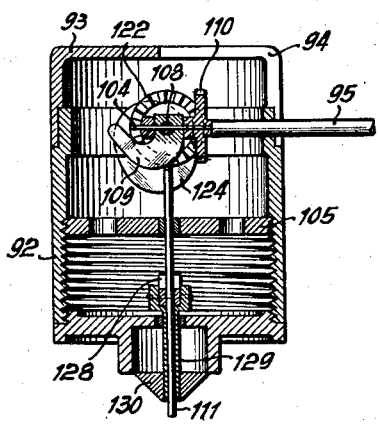
Fig. 14 is a sectional view taken along line XIV—XIV in Fig. 12.
Figure 15:
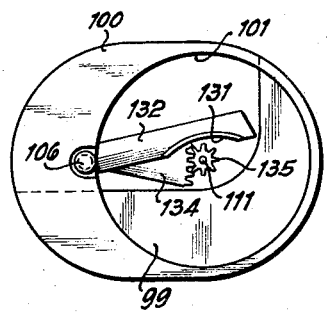
Fig. 15 is a plan view of a portion of the instrument of Fig. 13, certain of the upper parts being omitted.

In Fig. 13 the cone element 112 is shown substantially in its lowest position. Thus it will be seen that, when said cone element 112 is pressed downwardly due to swinging movement of the sighting rod 95 and the cam element 109, it will displace the lever 114 laterally so that the gear segment 117 is correspondingly moved to enable the pinion 118 to drive the carrier 120 and thus the height angle scale 89.

The side angle scale 90 is fixedly connected to the rotatable plate 103. The side angle will, consequently, be indicated through rotation of the cylindrical housing 92 and plate 103 about the axis of the ball bearing 102 due to rotary movement of the sighting rod 95 about said axis.

The actuating mechanism for the rotation angle scale is somewhat similar to that employed for the height angle scale in that it also employs a vertically displaceable cone element for laterally displacing an associated lever element. As may be seen from Fig. 13, the gear wheel 110 meshes with the toothed surfaces 122 of two gear wheels 121 rotatably supported on the axle 108 and on opposite sides of the cam element 109, respectively.

Connected to gear wheels 121 by means of sleeves surrounding portions of axle 108 are two identical but oppositely arranged cam members 124 and 125 which act on respective push rods 126 and 127 guided for vertical movement by suitable bearings in plate 105. This construction is so devised that the cam members 124 and 125, due to their opposite or reversed arrangement, either force both push rods 126 and 127 downwardly or permit simultaneous movement of said push rods upwardly when said cam members are driven in opposite senses by the gear wheel 110 upon swinging movement of sighting rod 95.

During their downward movement the push rods 126 and 127 act on a beam 128 rockably or tiltably supported at the upper end of a sleeve 129 mounted for vertical reciprocatory movement in the rotatable plate 103. The sleeve 129 is provided at its lower end with a cone element 130 similar to element 112. The cone element 130 cooperates with a beveled, arcuate cut-out 131 of a lever 132 which is biased against said cone element 130 by means of a spring (not shown).

This spring, as will also be readily understood, causes the cut-out portion 131 of the lever 132 to exert an upward camming action on the cone element 130, whereby the latter and sleeve 129 are biased upwardly and are supported in their uppermost position whenever the cam members 124 and 125 are so rotated as to permit upward movement of the push rods 126 and 127.

Lever 132 is connected to a gear segment 134 by means of a spacer sleeve 133 rotatable about a pivot pin 106, so that the gear segment is moved when the cone element 130 displaces the lever 132 laterally. The teeth of the gear segment 134 mesh with a pinion 135 to drive the latter in accordance with the movements of said gear segment. Connected to the pinion 135 is a carrier 136 which supports the rotation angle scale 91 so that the latter is rotated together with the pinion 135.

As may be seen from Fig. 13, the rotation angle indication is independent of the height angle indication. In measuring the height angle the gear wheel 110 is swung bodily about the axle 108 and, without being rotated itself, causes rotation of the gear wheels 121 and therethrough of the cam members 124 and 125 in the same direction.

As a result, one of the push rods 126 is depressed while the other push rod 127 is raised the same amount, or vice versa, so that the beam 128 is merely tilted or rocked on the upper end of sleeve 129 without axially displacing the latter and cone element 130.

On the other hand, when the sighting rod 95 is rotated about its own axis to bring the sighting indicator 96 into alignment with the corresponding member 9 on the writing implement, then the gear wheel is also rotated about its own axis. This causes the gear wheels 121 to be rotated in opposite directions, whereby the cam members 124 and 125 either depress both push rods or permit both of the latter to rise. The rotation angle scale 91 will thus be moved in one direction or another, accordingly.

It will, therefore, be realized that in the instrument according to Figs. 11 to 15 the angular movements of the scale plates in a plane substantially parallel to the plane of the writing surface are created by movements of mechanical elements in a direction substantially perpendicular to said plane. To state it in other words, the linear movements created in accordance with the characteristics of the writing implement are transformed into angular movements in a plane substantially perpendicular to the direction of said linear movements. Complicated compensating mechanisms to ensure high accuracy of measurement are thus not required.

From all of the above it will be seen that there has been provided, in accordance with a broad view of the invention, a process of determining the suitability of a writing implement having a writing member for use by a person, comprising the steps of holding said implement in a writing position relative to a writing surface and with said writing member in contact with said surface, measuring a side angle formed between the axis of said implement and a plane passing through the intersection of said writing member with and perpendicular to said surface, measuring a height angle formed between said axis of said implement and said writing surface, and thereafter comparing the respective measured angles with standard reference values given for said writing implement, whereby the suitability of said writing implement for use by said person is determined as a function of the indicated degree of correspondence between said measured angles and said standard reference values.

There has further been provided, in accordance with the invention, an angle measuring instrument for use in determining the suitability of a writing implement for use by a person, comprising a base plate having upper and lower surfaces and arranged to be located with said lower surface substantially parallel to a writing surface, a sighting rod movably supported on said base plate and arranged to be parallelized with the axis of said implement when the latter is held in writing position relative to said writing surface by said person, height angle indication means supported by said base plate for indicating the angular elevation of said axis of said implement above said writing surface, side angle indication means supported by said base plate for indicating the lateral angular displacement of said axis of said implement from a predetermined plane disposed substantially perpendicularly to said writing surface, and means operatively connecting said sighting rod with both said indication means for actuating the latter in response to the movements of said sighting rod during parallelization of the latter with said axis of said writing implement.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An angle measuring instrument for use in determining the suitability of a writing implement for use by a person, comprising a base plate having upper and lower surfaces and arranged to be located with said lower surface substantially parallel to a writing surface, a sighting rod movably supported on said base plate and arranged to be parallelized with the axis of said implement when the latter is held in writing position relative to said writing surface by said person, height angle indication means supported by said base plate for indicating the angular elevation of said axis of said implement above said writing surface, side angle indication means supported by said base plate for indicating the lateral angular displacement of said axis of said implement from a predetermined plane disposed substantially perpendicularly to said writing surface, means operatively connecting said sighting rod with both said indication means for actuating the latter in response to the movements of said sighting rod during parallelization of the latter with said axis of said writing implement, rotation angle indication means supported on said base plate for indicating the angular rotation of said implement about its own axis from a predetermined position of said implement relative to said writing surface, sighting means carried by said sighting rod and extending substantially at right angles from the latter and parallelizable with a corresponding member provided on said implement, and means operatively connecting said sighting means with said rotation angle indication means to actuate the latter in response to movements of said sighting means during parallelization of the latter with said member on said implement.

2. An instrument according to claim 1, each of said indication means including a scale, all of said scales being disposed in the same plane.

3. An instrument according to claim 1, each of said indication means including a scale, said scales being disposed, respectively, in three different planes, two of said planes being perpendicular to each other.

4. An instrument according to claim 3, one of said scales in said perpendicular planes being arranged parallel to said lower surface of said base plate.

5. An angle measuring instrument for use in determining the suitability of a writing implement for use by a person, comprising a base plate having upper and lower surfaces and arranged to be located with said lower surface substantially parallel to a writing surface, a sighting rod movably supported on said base plate and arranged to be parallelized with the axis of said implement when the latter is held in writing position relative to said writing surface by said person, height angle indication means supported by said base plate for indicating the angular elevation of said axis of said implement above said writing surface, side angle indication means supported by said base plate for indicating the lateral angular displacement of said axis of said implement from a predetermined plane disposed substantially perpendicularly to said writing surface, and means operatively connecting said sighting rod with both said indication means for actuating the latter in response to the movements of said sighting rod during parallelization of the latter with said axis of said writing implement, said means connecting said sighting rod with said height and side angle indication means comprising a plurality of elements displaceable linearly in response to said movements of said rod, said indication means including respective lever members pivotally mounted on said base plate, said lever members engaging said elements, respectively, and being constructed to be displaced angularly with respect to the direction of movement of said elements as the latter are displaced due to said movements of said rod, to thereby transform said linear movements of said elements into rotary movements of said lever members.

6. An attachment for use with an angle measuring instrument to be employed in determining the adaptability of a writing implement to a person, said instrument having height and side angle indication means and a sighting rod parallelizable with the axis of said implement and operatively connected to said angle indication means for actuating the latter in response to movements of said rod during parallelization thereof with said axis; comprising a tubular member constructed to be fitted over and frictionally retained on said sighting rod for rotation about the axis of said rod, a pointer affixed to said tubular member and extending substantially at right angles from the latter, a sighting element affixed to said tubular member and extending substantially at right angles from the latter, said sighting element being arranged for parallelization with a sighting member attached to said implement when the latter is held by said person, which sighting member extends from said implement substantially at right angles to the axis of the latter, said pointer and said sighting element including an angle of such magnitude that said pointer is at its null position when said sighting element is parallel with said sighting member of said writing implement and the latter is in a predetermined position, whereby, upon rotation of said implement about its own axis from said predetermined position, said pointer will indicate the extent of said rotation in response to reparallelization of said sighting element with said sighting member through rotation of said tubular member about said axis of said sighting rod.

7. An auxiliary attachment for use with a writing implement having a writing member during determination of the spatial position of said implement with respect to a writing surface, comprising a cap-like element constructed to be fitted over the end of said implement remote from said writing member, means on said element for predetermining the position of the latter on said implement, a first sighting rod extending axially from said element for alignment with the axis of said implement, and a second sighting rod extending from said element substantially at right angles to said first sighting rod, whereby the spatial position of said implement above said writing surface may be determined by viewing of said first sighting rod, while the extent of rotation of said implement about its own axis from a reference position of said writing member relative to said writing surface may be determined by viewing of said second sighting rod.

8. An angle measuring instrument for use in determining the suitability of a writing implement for use by a person, comprising means for measuring a side angle formed between the axis of said implement, when the same is held by said person in the latter's normal writing position with the writing member of said implement contacting a surface, and a plane extending substantially at right angles to said surface and to the normal direction of lines of writing on said surface, means for concurrently measuring a rotation angle of said implement about said axis from a predetermined null position of said writing member relative to said surface, and means responsive to operation of said measuring means for indicating the relationships between said angles as measured and respective standard reference values associated with said implement, whereby the suitability of said writing implement for use by said person is determined as a function of the indicated degree of correspondence between said measured angles and said standard reference values.

9. An instrument according to claim 8, further comprising means for concurrently measuring a height angle formed between said axis of said writing implement and said surface, said responsive means indicating additionally the relationship between said height angle as measured and a further respective standard reference value associated with said implement.

10. An angle measuring instrument for use in determining the suitability of a writing implement for use by a person, comprising means for measuring a height angle formed between a surface and the axis of said implement when the same is held by said person in the latter's normal writing position with the writting member of said implement contacting said surface, means for concurrently measuring a rotation angle of said implement about said axis from a predetermined null position of said writing implement relative to said surface, and means responsive to operation of said measuring means for indicating the relationships between said angles measured and respective standard reference values associated with said implement, whereby the suitability of said writing implement for use by said person is determined as a function of the indicated degree of correspondence between said measured angles and said standard reference values.

References Cited in the file of this patent

UNITED STATES PATENTS

| | | |
|---|---|---|
| 1,226,141 | Sterling et al. | May 15, 1917 |
| 2,149,715 | Pearson | Mar. 7, 1939 |
| 2,582,080 | Stroukoff et al. | Jan. 8, 1952 |

FOREIGN PATENTS

| | | |
|---|---|---|
| 217,318 | Germany | Dec. 24, 1909 |
| 344,256 | Germany | Nov. 21, 1921 |